C. WHEELER, Jr.
GRAIN AND GRASS HARVESTER.
No. 881. Reissued Jan. 3, 1860.
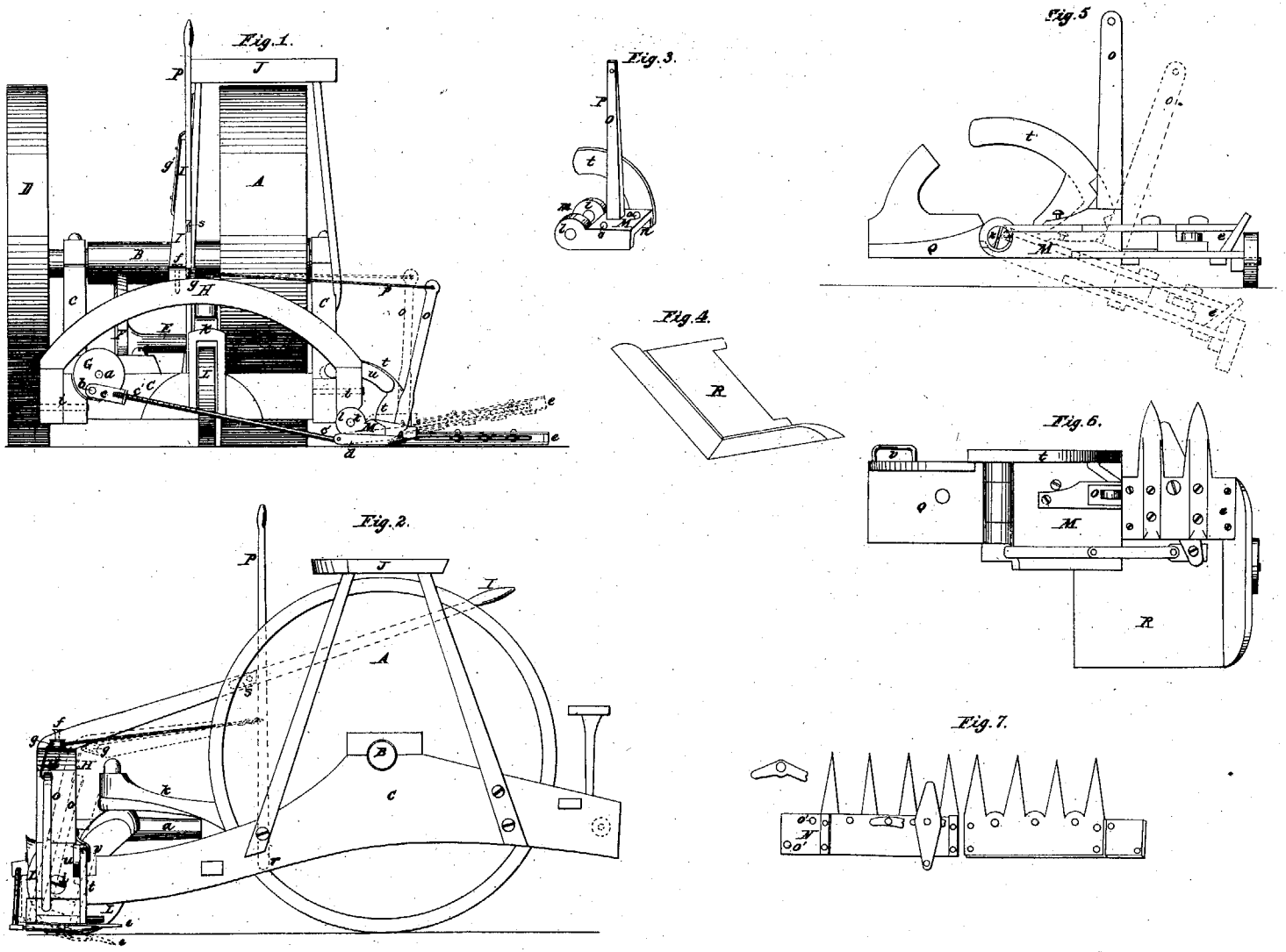
Witnesses:
Thos. Huffman
E. Cohen
Inventor:
Cyrenus Wheeler Jr.
THE NORRIS PETERS CO., PHOTO-LITHO., WASHINGTON, D. C.

UNITED STATES PATENT OFFICE.

CYRENUS WHEELER, JR., OF POPLAR RIDGE, NEW YORK.

IMPROVEMENT IN GRAIN AND GRASS HARVESTERS.

Specification forming part of Letters Patent No. 12,044, dated December 5, 1854; Reissue No. 881, dated January 3, 1860.

DIVISION G.

*To all whom it may concern:*

Be it known that I, CYRENUS WHEELER, Jr., of Poplar Ridge, in the county of Cayuga and State of New York, have invented certain new and useful Improvements in Grain and Grass Harvesters; and I do hereby declare the following to be a full, clear, and exact description of the same, reference being had to the accompanying drawings, making a part thereof, in which—

Figure 1 represents a rear elevation of a harvester. Fig. 2 represents an elevation thereof, taken from that side of the machine that runs next the standing grain. Figs. 3 and 4 represent detached portions of the machine. Figs. 5 and 6 represent, on an enlarged scale, respectively a rear elevation and a plan of a finger-bar hinged to a shoe, and its motions thereon. Fig. 7 represents a cutting apparatus.

The advantage of a drooping main frame is this, that it brings down the gearing from the main driver to the crank or crank-wheel in a direct line and leaves the crank nearly in line with the cutter-bar, which enables it to drive the latter with much less friction than where portions of the gear are horizontal and portions vertical, or where the pitman is inclined or bent; and in order that such a drooping main frame shall not be influenced by the horses on ascending or descending ground, or in crossing knolls or ridges, the tongue should be loose—that is to say, hinged instead of rigid—so as not to impart any of its positions to the main frame; and, again, that the motions of the main frame which it receives from the main wheels passing over inequalities in the ground may not be injuriously communicated to the cutter-bar, is another important element in this connection. To avail myself of these three important things in one machine is the object of this part of my invention; and my invention consists in combining with a drooping main frame and a loose or hinged tongue a finger-bar that is so hinged as to be uninfluenced in its operation by the shocks, jars, or position of the two main wheels as they pass over the ground; or, in other words, such an arrangement of tongue, main frame, and finger-bar as that the tongue, which receives its position and motions from the horses, shall not influence the main frame, which receives its motions from the carrying-wheels, and so that, also, the motions of the main frame shall not influence the cutter bar in freely rising above or falling below the plane over which the main supporting or driving wheels are passing, each having its peculiar independent movement.

To enable others skilled in the art to make and use my invention, I will proceed to describe the same with reference to the drawings.

C represents a drooping main frame—that is to say, a main frame suspended to or by an axle, B, supported in suitable driving and supporting wheels, and inclining from its points of support toward the point where the pitman that drives the cutter-bar is to be arranged, so that the crank shall come well down into the line of the cutter-bar that it is to operate. To such a main frame the tongue by which it is drawn and guided should be attached by pivots or some other connection that will allow it to move independent of the main frame, more especially on uneven ground or in crossing knolls or ridges, or, rather, indispensably so. Now, this loose connection of tongue and main frame, so far as they go, do not injuriously transmit their motions to each other but would not, without some other means than before used, leave the finger-bar free to have its own motions without having those of the tongue and main supporting or driving wheels unnecessarily communicated to it, and hence I use a hinged joint, *k*, between the cutter-bar and the main frame, that joint allowing the finger-bar to freely swing above or fall below the plane over which the main driving or supporting wheels may be passing; and thus, with a limber tongue, I still prevent the motions of the main frame or driving-wheel from being injuriously communicated to the finger-bar, which is drawn over the ground and influenced only by the inequalities or undulations of that part of the ground over which it and the rear of the main frame pass and independent of the horses, the tongue, or the driving-wheel. The drooping frame, too, admits of such an arrangement of gearing from the main driver to the crank as not to present any abrupt lines in its general direction, or to bend or materially incline the pitman, either of which variations from a direct line produces much unnecessary friction in the working parts of the machine.

Having thus fully described the nature and object of my invention, what I claim under this patent is—

The combination of the drooping main frame, the loose tongue, and a hinged finger-bar, substantially as and for the purpose described.

CYRENUS WHEELER, JR.

Witnesses:

THOS. H. UPPERMAN,

E. COHEN.